Figure 1:
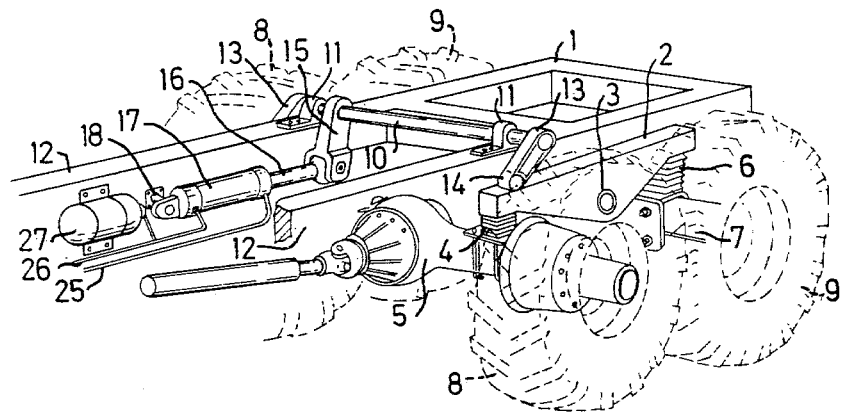

United States Patent [19]

Johansson

[11] 4,324,417
[45] Apr. 13, 1982

[54] VEHICLE WITH BOGIE-MOUNTED WHEELS AND RAISING DEVICE FOR A PAIR OF WHEELS

[75] Inventor: Sixten A. M. Johansson, Eskilstuna, Sweden

[73] Assignee: Volvo BM AB, Eskilstuna, Sweden

[21] Appl. No.: 130,626

[22] Filed: Mar. 17, 1980

[30] Foreign Application Priority Data

Apr. 23, 1979 [SE] Sweden ............................. 7903536

[51] Int. Cl.³ .................................................. B60G 11/30
[52] U.S. Cl. ..................................... 280/678; 280/681; 280/704
[58] Field of Search .............. 280/704, 681, 677, 676, 280/678

[56] References Cited

U.S. PATENT DOCUMENTS

| | | | |
|---|---|---|---|
| 2,999,695 | 9/1961 | Bixby | 280/681 |
| 3,175,841 | 3/1965 | Smith | 280/683 |
| 3,366,399 | 1/1968 | Hunger | 280/678 |
| 3,499,663 | 3/1970 | Hedlund | 280/704 |
| 3,992,039 | 11/1976 | Hiruma | 280/703 |
| 4,165,884 | 8/1979 | Allison | 280/704 |

FOREIGN PATENT DOCUMENTS

| | | |
|---|---|---|
| 493669 | 6/1978 | Australia . |
| 2407970 | 9/1974 | Fed. Rep. of Germany ...... 280/704 |
| 2616152 | 10/1976 | Fed. Rep. of Germany . |

*Primary Examiner*—Robert R. Song
*Attorney, Agent, or Firm*—Young & Thompson

[57] ABSTRACT

A vehicle such as a dumper with articulated steering has a load-carrying portion supported by two wheel-pairs mounted on bogies. One wheel-pair can be raised from the ground while the other, still on the ground, has softer suspension. In a vehicle with its two portions relatively swingable around a longitudinal axis, the two wheels on the ground are coupled so as to move relatively identically in relation to the vehicle frame. With one wheel-pair raised and the other suspended, the vehicle is still laterally stable. Spring suspension is obtained by tipping the bogies using a mechanism actuated by a hydraulic cylinder with a gas accumulator attached to the feeder line of the hydraulic cylinder. Gas spring suspension thus occurs only when one wheel-pair is raised.

6 Claims, 2 Drawing Figures

U.S. Patent

Apr. 13, 1982

4,324,417

VEHICLE WITH BOGIE-MOUNTED WHEELS AND RAISING DEVICE FOR A PAIR OF WHEELS

The present invention relates to a vehicle with a load-carrying vehicle part which is supported by two wheel-pairs arranged one behind the other and suspended with the aid of a bogie frame beam on either side of the vehicle. The invention is primarily related to construction vehicles of this type, especially a dumper. The load-carrying portion of such vehicles often lacks any other spring suspension than that provided by the tires. The spring characteristics are thus adapted to fully loaded operation, which results in practically rigid suspension when driving unloaded.

When driving an unloaded dumper of the type described above, even small obstacles on the ground produce significant vertical accelerations of the vehicle. These accelerations reach a maximum at the low vehicle speed of 9–13 km/h. When the road or ground has a surface structure of class 0.6, i.e. an obstacle height of 4–6 cm, accelerations of about 3 g are produced at 11 km/h. The accelerations decrease again at higher speeds, e.g. 25 km/h, or the maximum speed allowed in Sweden, 30 km/h. Since the accelerations are so great within the range 9–13 km/h as to put a severe strain on both the driver and the vehicle, the driver will not accelerate through this interval to the higher speeds, but will choose to drive the vehicle at a lower speed, about 8–9 km/h, where the acceleration stresses are acceptable.

Thus, known wheel suspensions for vehicles of the type described above result in subjecting the driver and the vehicle to great stresses, so that the theoretical maximum speed of the vehicle cannot be utilized, thus decreasing the work capacity. Road wear is also greater, due to the hopping movements of the vehicle. In order to give the vehicle a lower self frequency, and thus dampen the accelerations when driving unloaded, it is known in trucks to lift one of the bogie-mounted wheel axles so that only the wheels of the other axle touch the ground. However, no significant reduction of the accelerations has been achieved in this way. The primary advantage of this arrangement has been that the lifted wheel pair is not subjected to tire wear.

The purpose of the present invention is to achieve a wheel suspension which reduces the above-mentioned disadvantages so that the vehicle at a given obstacle height can be driven at higher speed without increasing said accelerations.

According to the invention, this is achieved with a vehicle which has the characteristics hereinafter claimed. With such an arrangement, a softer spring suspension is engaged when the vehicle is empty, whereby ground roughness can be absorbed so that it produces smaller accelerations of the vehicle frame. Such a suspension device according to the invention can, for example, permit the above-mentioned dumper to be driven unloaded on ground with a surface structure class 0.6 at its maximum speed of 30 km/h without exceeding said acceleration value of 3 g. This value of 3 g, measured on the floor of the cab, for example, is often considered to be the maximum to which the driver can be subjected, provided he has a proper elastically supported seat. Thus by using the invention, the vehicle speed can be increased, as well as reducing "washboard" formation on roads.

The invention is especially intended for articulated construction vehicles such as dumpers, the two vehicle parts of which are also, with the aid of a further bearing, turnable in relation to each other around a longitudinal axis of the vehicle. Depending on the vehicle construction, this bearing can be arranged on either vehicle part, i.e. in front of or after the vertical axis of the articulated steering. The parts of the vehicle are thus swingable relative to each other both around a vertical axis and around a longitudinal, preferably horizontal axis. For such a vehicle to have lateral stability, its wheel axles must not be allowed to swing freely in relation to the vehicle frame. In known vehicles of this type, this is achieved by immovably fixing single axles to the vehicle and, for bogie-mounted axles, making the pivot axis of the bogie frame immovable in relation to the vehicle frame. If now, according to the invention, one bogie-mounted pair of wheels is raised and the other is at the same time provided with spring suspension, a vehicle with a longitudinal axis bearing would be unstable. According to a further development of the invention, vehicles of this type have control means disposed so that when one pair of wheels is in the raised position, the suspension movements of the other pair of wheels are controlled so that the movements of these two wheels are mutually essentially identical. Thus, if the two ground-engaging wheels are forced to have synchronous vertical movement, the lateral stability of the vehicle is preserved.

According to an embodiment of the invention, the bogies can be pivoted under the influence of a pressure-medium cylinder or the like to raise one wheel pair from contact with the ground. A gas accumulator is connected to the pressure-medium cylinder, whereby gas spring suspension is automatically engaged for only the wheel pair engaging the ground. The spring characteristics can, however, be achieved in a number of other ways, for example by means of rubber springs, torsion springs of steel etc.

The two bogies can be acted on by a common mechanism or by individual mechanisms, which provide synchronous wheel movement.

Figure 2:
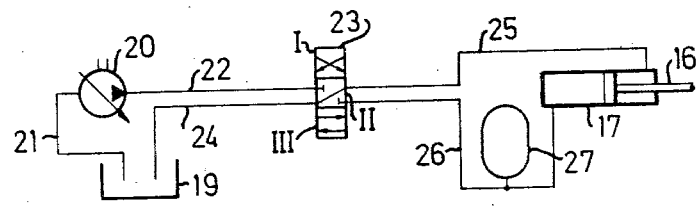

An embodiment of the invention is described below in more detail with reference to the accompanying drawing, in which:

FIG. 1 shows in a simplified perspective view the rear portion of the vehicle frame of a dumper, and FIG. 2 shows a diagram of the hydraulic wheel raising device.

FIG. 1 shows a portion of the vehicle frame 1 of the rear part of a dumper, which carries the tippable dumper body. The dumper has articulated steering, and the vehicle frame 1 is joined, in a manner which is known and thus not shown in more detail here, to the front, cab-carrying portion of the vehicle by means of bearings which permit swinging between the vehicle portions both around a vertical axis, for steering the vehicle, and around a longitudinal axis, which permits the vehicle portions to follow uneven terrain by relative lateral tipping. On either side of the vehicle frame 1, there is a bogie frame beam 2 arranged pivotable around a horizontal shaft 3 extending from the respective side member 12. The front ends of the two bogie beams 2 are each joined via a rubber joint 4 to the ends of the rear drive axle 5 of the vehicle. In a corresponding manner, the rear ends of the bogie beams 2 are joined via rubber joints 6 to the ends of the trailing axle 7. The drive axle 5 carries a pair of drive wheels 8 and the trailing axle 7 carries a pair of non-driven wheels 9.

A rod 10 is arranged transversely over the vehicle frame 1 and is rotatably journalled in bearing brackets 11 on the side members 12 of the frame 1. The ends of the rod 10 extend outside the side members 12 above the front ends of the bogie beams 2. Swing arms 13 are non-rotatably joined to the ends of the rod 10. At the free end of each swing arm 13, there is a roller 14 arranged with its rotational axis parallel to the rod 10. Next to one side member 12, there is a linking arm 15 with one end non-rotatably joined to the rod 10. The other end of the linking arm 15 is articulated to the piston rod 16 of a hydraulic cylinder 17, which in the embodiment shown is double-acting. The other end of the hydraulic cylinder is swingably journalled to a bracket 18 on the side member 12.

The hydraulic cylinder 17 is operated with the hydraulic system shown schematically in FIG. 2. A pump 20 draws hydraulic fluid from a tank 19 via a line 21 and feeds it to a pump pressure line 22, which leads to a control valve 23. A return line 24 extends from the valve 23 to the tank 19. A cylinder line 25 extends from the valve 23 to the piston rod chamber of the cylinder 17 and a cylinder line 26 leads to the piston chamber of the cylinder 17. A gas accumulator 27 is connected to the line 26.

The control valve 23 has three valve positions: I, II and III. In position I the pump pressure line 22 is connected to the cylinder line 26 to the piston chamber of the cylinder 17. The piston rod 16 is thereby extended, thus swinging the rod 10 via the linking arm 15 counter-clockwise as viewed in the drawing. The swing arms 13 at the ends of the rod 10 are thus swung down from an inactive horizontal position (not shown) until the rollers 14 engage the top of the forward end of the respective bogie beam 2. Continued pressure feed and extension of the piston rod 16 will then result in the swing arms 13 causing the bogie beams 2 to swing around their shafts 3. This raises the trailing axle 7 and the wheels 9 at the same time as the drive axle 5 and the drive wheels 8 are lowered. The control valve 23 can be actuated automatically in response to vehicle load or manually by the operator. When the desired height difference is achieved between the wheels 8 and 9 for the driving to be done, the valve 23 is switched to position II. In this position the cylinder line 26 is blocked while the line 25 leading from the piston rod chamber is connected, as in position I, to the return line 24. In this position II, spring suspension of the wheels 8 is achieved by virtue of the fact that they are supported not only by the shafts 3 of the bogie beams 2 but by the cylinder 17 as well, via the linking arm 15, the rod 10 and the swing arms 13. The spring action is obtained as gas spring action by the gas accumulator 27 between the piston chamber of the cylinder 17 and the block in the valve 23. The symmetrical arrangement of the swing arms 13 on the rod 10 also prevents the drive axle 5 from rocking in relation to the vehicle frame 1. The wheels 8 move identically so that the vehicle is laterally stable in spite of its longitudinal rotational articulation.

When the vehicle is loaded, the valve 23 is switched to position III, so that the piston rod 16 is retracted into the cylinder 17. The swing arms 13 are thereby swung up to their inactive position out of contact with the bogie beams 2. When this has been completed, the valve 23 is returned to the rest position II. The swing arms now have no effect on the bogie beams 2, which are allowed to rock in a normal manner about their shafts 3. The vehicle axles 5 and 7 are essentially rigidly connected to the bogie beam 2, and thus the elasticity of the wheels 8,9 alone provide spring action for the vehicle.

When the load has been dumped and the vehicle is to be driven unloaded again, valve 23 is returned to position I to swing down the swing arms 13, thereby raising wheel-pair 9 and lowering wheel-pair 8 at the same time as the gas suspension is engaged.

What I claim is:

1. A vehicle having a load-carrying frame, a bogie frame disposed on either side of the load-carrying frame, means mounting the bogie frames on the load-carrying frame for vertical swinging movement about a horizontal axis, a first wheel pair mounted on the bogie frames on one side of said axis, a second wheel pair mounted on said bogie frames on the other side of said axis, spring means yieldably urging one said wheel pair downwardly relative to the other said wheel pair, and means for selectively applying and releasing the spring action of said spring means.

2. A vehicle as claimed in claim 1, in which said spring means comprises a gas accumulator.

3. A vehicle as claimed in claim 1, in which said applying means comprises a pressure medium cylinder.

4. A vehicle as claimed in claim 1, said applying means comprising two arms one acting on each side bogie frame, and means mounting said arms for conjoint swinging movement on and relative to said load-carrying frame.

5. A vehicle as claimed in claim 4, said mounting means for said arms comprising a rod disposed parallel to said axis, said arms being carried by said rod.

6. A vehicle as claimed in claim 5, and a pressure-medium cylinder carried by said load-carrying frame and connected with said rod to rotate said rod thereby to swing said arms.

* * * * *